United States Patent Office 2,801,252
Patented July 30, 1957

2,801,252

2,5-DIALKOXY-DIHYDROFURANS AND TETRAHYDROFURANS

Niels K. F. W. Clauson-Kaas, Hjortekaer, Denmark, assignor to A/S Sadolin & Holmblad, Copenhagen, Denmark No Drawing. Application January 11, 1954,
Serial No. 403,465

3 Claims. (Cl. 260—347.8)

The present invention relates to new chemical compounds and includes furan derivatives having utility in the synthesis of pyridine-1-oxides, 2-piperidones and pyrocatechols. The compounds of the invention are prepared by reacting a 2-acetylfuran (I) with an orthoformate to give the corresponding ketal (II) which are then alkoxylated to the corresponding 2,5-dialkoxy-2,5-dihydrofuran (III). These products can be catalytically hydrogenated to the corresponding tetrahydrofurans (IV) which on boiling in an aqueous acid medium are converted to the corresponding pyrocatechols. The 2,5-dialkoxyl-2,5-dihydrofurans (III) can also be reacted with an aqueous solution of hydroxylamine hydrochloride to yield 2-methyl-3,6-pyridinediol-1-oxides (V). These products can in turn be catalytically hydrogenated to the corresponding 2-piperidones (VIII–IX). The 2-methyl-3,6-pyridinediol-1-oxides (V) can be converted to corresponding di-acetates and mono-acetates (VI–VII). The reactions involved may be illustrated by the following general formulas:

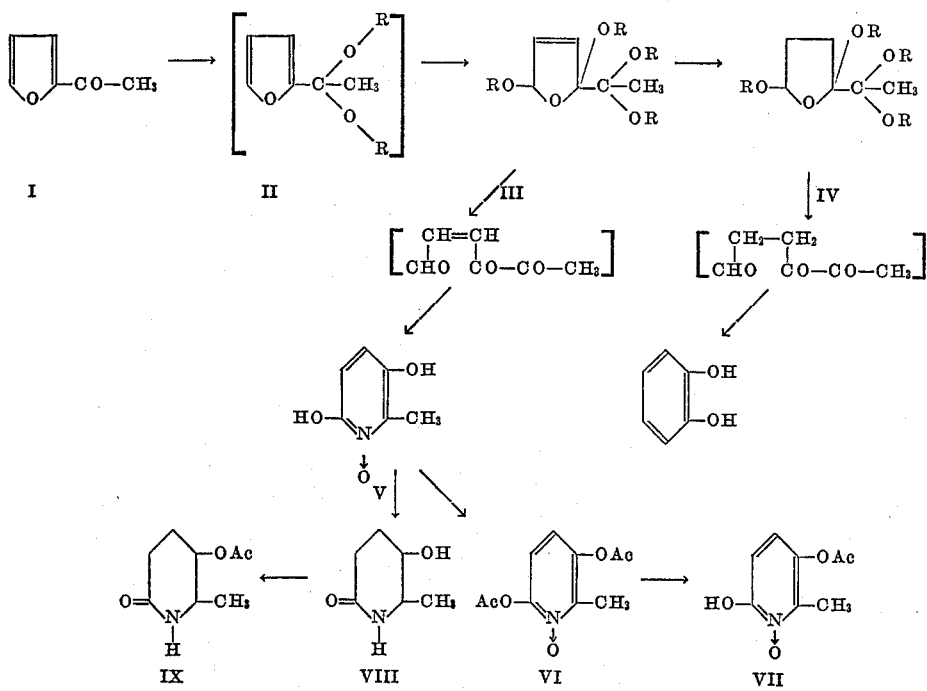

The following examples will serve to illustrate the invention.

EXAMPLE 1

*2,5-dimethoxy-2-(α,α-dimethoxyethyl)-2,5-dihydrofuran (III–R=CH₃)*

2-acetyl-furan (3.30 g.) and methyl orthoformate (3.50 g.) were added to a solution of p-toluenesulfonic acid (8.6 mg.) in anhydrous methanol (10 ml.) and the mixture heated under reflux for about 10 minutes. To the resulting solution of 2-(α,α-dimethoxyethyl)-furan (II–R=CH₃) in methanol was added a solution of ammonium bromide (0.60 g.) in methanol (30 ml.), whereafter the mixture was electrolyted in the cell described by F. Limborg and N. Clauson-Kaas, Acta. Chem. Scand., 7, 234–235 (1953). After electrolysis the resulting reaction product (III–R=CH₃) was isolated in the usual way. The yield was 4.15 g. of a colorless liquid, B. P. 108–115° (14 mm.), $n_D^{25}$ 1.4499.

EXAMPLE 2

*2,5-dimethoxy-2-(α,α-dimethoxyethyl)-tetrahydrofuran (IV–R=CH₃)*

The reaction product from the above example (3.0 g.), methanol (15 ml.) and potassium hydroxide (11 mg.) were shaken with Raney nickel (0.3 g.) under hydrogen (100 atm.) for about 3 hours and the resulting reaction product (IV–R=CH₃) isolated by distillation. The yield was 2.52 g. of a colorless liquid, B. P. 116–119° (14 mm.), $n_D^{25}$ 1.4387.

On heating under reflux with N hydrochloric acid for about 2 hours the reaction product (III–R=CH₃) is transformed into pyrocatechol.

EXAMPLE 3

*2-methyl-3,6-pyridinediol-1-oxide (V)*

2,5 - dimethoxy - 2 - (α,α - dimethoxyethyl)-2,5-dihydrofuran (0.44 g.) was dissolved in water (5 ml.) and the solution added to a solution of hydroxylamine hydrochloride (0.21 g.) in water (2 ml.). The mixture was left standing for about 15 minutes whereby the reaction product (V) precipitated as white crystals (0.25 g.). After crystallization from ethanol the M. P. was 234–236° C.

Acetylation of the reaction product (V) with acetic anhydride-pyridine in the usual way gave a diacetate (VI), M. P. 96–98° C., which by reaction with methanol gave a monoacetate (VII), M. P. 129–131° C.

EXAMPLE 4

*5-hydroxy-6-methyl-2-piperidone (VIII)*

2-methyl-3,6-pyridinediol-1-oxide (1.00 g.) and methanol (30 ml.) were shaken with Raney nickel (0.4 g.) under hydrogen (100 atm.) at 100° C. for about 1 hour. The reaction product (VIII) was isolated in the usual way as white crystals, M. P. 178–180° C., M. P. of hydrochloride ($C_6H_{12}O_2NCl$, prepared in the usual way) 146–149° C.

Acetylation of the reaction product (VIII) with acetic anhydridepyridine in the usual way gave a monoacetate (IX), M. P. 169–172° C.

In the formulas given above R represents methyl or ethyl. R in the examples is methyl. Compounds where R is ethyl can be readily prepared by converting compound I to compound III using ethyl orthoformate and ethanol in place of the methyl orthoformate and methanol employed in Example 1. When ethyl orthoformate is used with methanol the R's on the α-ethyl carbon may be methyl or ethyl or mixed. In the reactions shown the R groups are split off and do not appear in the reaction products. The 3,4-positions on the acetyl-furan ring can be substituted with various groups including hydroxymethyl, acetoxymethyl, carbalkoxy and alkyl groups. These groups are not removed in the reactions shown and appear in reaction products. Their preparation is similar to that disclosed in the above examples by employing 3 or 4 or 3,4-substituted 2-acetylfurans. The preferred catalyst for the ketalization of the keto group (see Example 1) is a sulfonic acid such as p-toluenesulfonic acid, benzene sulfonic acid, methane sulfonic acids and the like.

I claim:

1. Products selected from the group consisting of 2,5-di-RO-2-(α,α-di-RO-ethyl)-2,5-dihydrofuran and 2,5-di-RO-2-(α,α-di-RO-ethyl)-tetrahydrofuran, where R is selected from the group consisting of methyl and ethyl.
2. 2,5-dimethoxy-2-(α,α - dimethoxyethyl) - 2,5 - dihydrofuran.
3. 2,5-dimethoxy - 2 - (α,α - dimethoxyethyl) - tetrahydrofuran.

References Cited in the file of this patent

UNITED STATES PATENTS

| | | |
|---|---|---|
| 2,465,988 | Jones | Apr. 5, 1949 |
| 2,489,546 | Tchelitcheff | Nov. 29, 1949 |
| 2,498,435 | Lee | Feb. 21, 1950 |
| 2,512,732 | Aeschlimann | June 27, 1950 |
| 2,572,579 | Urban | Oct. 23, 1951 |
| 2,682,546 | Copelin | June 29, 1954 |

OTHER REFERENCES

Fakstorp: JACS 72:869–874 (1950).

Clauson-Kaas: Acta. Chem. Scand. 6:545–50 (1952) (C. A. 47:7479i).

Wagner: Synthetic Org. Chem. (1953) John Wiley and Sons.